United States Patent
Noda et al.

(10) Patent No.: US 7,769,527 B2
(45) Date of Patent: Aug. 3, 2010

(54) INTERNAL COMBUSTION ENGINE

(75) Inventors: Toru Noda, Yokohama (JP); Atsushi Teraji, Yokohama (JP); Takashi Araki, Chigasaki (JP); Akihiko Kakuho, Atsugi (JP); Isamu Hotta, Chigasaki (JP); Koichi Ashida, Fujisawa (JP); Masaharu Kassai, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 205 days.

(21) Appl. No.: 12/169,956

(22) Filed: Jul. 9, 2008

(65) Prior Publication Data

US 2009/0043479 A1    Feb. 12, 2009

(30) Foreign Application Priority Data

Aug. 6, 2007 (JP) ............................. 2007-204709
Apr. 16, 2008 (JP) ............................. 2008-107232

(51) Int. Cl.
*F02B 11/00* (2006.01)

(52) U.S. Cl. .................... 701/104; 123/3; 123/299; 123/300; 123/304; 123/575; 123/577

(58) Field of Classification Search ............. 701/104; 123/3, 299, 300, 304, 575–578
See application file for complete search history.

(56) References Cited

U.S. PATENT DOCUMENTS

| 6,227,151 | B1 | 5/2001 | Ma |
| 6,371,094 | B1 * | 4/2002 | Wagner ................. 123/576 |
| 6,659,071 | B2 * | 12/2003 | LaPointe et al. ............ 123/299 |
| 7,188,607 | B2 * | 3/2007 | Kobayashi .................. 123/431 |
| 7,320,302 | B2 * | 1/2008 | Kobayashi .................. 123/299 |

FOREIGN PATENT DOCUMENTS

| CA | 2 539 711 A1 | 6/2006 |
| EP | 1 378 644 A2 | 1/2004 |
| JP | 2004-036538 A | 2/2004 |
| WO | WO 2006/013870 A1 | 2/2006 |

* cited by examiner

*Primary Examiner*—Erick Solis
(74) *Attorney, Agent, or Firm*—Foley & Lardner LLP

(57) ABSTRACT

An internal combustion engine (100) comprises a fuel injection valve (21, 22) which supplies a first fuel having a higher self-ignitability than gasoline and a second fuel having a higher combustion speed than gasoline such that an air-fuel mixture containing the first fuel and the second fuel is formed in a combustion chamber (14), a spark plug (25) which ignites the air-fuel mixture, and a programmable controller (41) programmed to control supply proportions of the first fuel and the second fuel such that the ignited air-fuel mixture undergoes flame propagation combustion and then undergoes self-ignition combustion. Thus, a reduction in emissions can be achieved, and high thermal efficiency can be realized through the self-ignition combustion.

20 Claims, 15 Drawing Sheets

32··· LOW-PRESSURE FUEL PUMP
33··· FUEL SEPARATOR
34··· FUEL REFORMING MECHANISM
35··· GAS PUMP
36··· HIGH-PRESSURE FUEL PUMP
51··· ACCELERATOR PEDAL DEPRESSION SENSOR
52··· CRANK ANGLE SENSOR
53··· WATER TEMPERATURE SENSOR
71··· VARIABLE COMPRESSION RATIO MECHANISM
161··· VALVE DRIVING MECHANISM
181··· VALVE DRIVING MECHANISM

US 7,769,527 B2

INTERNAL COMBUSTION ENGINE

FIELD OF THE INVENTION

This invention relates to an internal combustion engine that performs premixed compression ignition combustion.

BACKGROUND OF THE INVENTION

JP2004-036538A, published by the Japan Patent Office in 2004, discloses an internal combustion engine that causes an air-fuel mixture to undergo compression ignition combustion (self-ignition combustion).

The internal combustion engine according to the prior art forms a homogeneous air-fuel mixture of gasoline in a combustion chamber. The internal combustion engine then injects hydrogen gas, which has a comparatively high octane value and does not self-ignite easily, in the vicinity of top dead center of a compression stroke to form a hydrogen-air mixture on the periphery of a spark plug. The hydrogen-air mixture is subjected to spark ignition combustion by the spark plug, and homogeneous air-fuel mixture in an unburned region is compressed as a result of combustion expansion of the hydrogen-air mixture so as to undergo self-ignition combustion.

SUMMARY OF THE INVENTION

In the internal combustion engine according to the prior art, the hydrogen gas is distributed locally around the spark plug. Therefore problems such as the following arise in relation to emissions.

The leanness of the hydrogen-air mixture is limited due to the fact that ignition must be performed reliably by the spark plug. Accordingly, the hydrogen concentration of the hydrogen-air mixture is set comparatively high to achieve high temperature combustion. As a result, nitrogen oxides (NOx) are generated inevitably during combustion of the hydrogen-air mixture. Furthermore, the homogeneous air-fuel mixture in the unburned region is compressed by the combustion expansion of the hydrogen-air mixture so as to self-ignite sequentially from the location of an ignition point. The homogeneous air-fuel mixture cannot be caused to self-ignite at the same time throughout the entire combustion chamber. During a low load period of the engine in particular, self-ignition cannot be generated in a region in the vicinity of a cylinder wall surface, and therefore the amount of discharged unburned fuel increases.

It is therefore an object of this invention to provide an internal combustion engine that can achieve a reduction in emissions while realizing high thermal efficiency through self-ignition combustion.

To achieve this object, this invention provides an internal combustion engine comprising a fuel injection valve which supplies a first fuel having a higher self-ignitability than gasoline and a second fuel having a higher combustion speed than gasoline such that an air-fuel mixture containing the first fuel and the second fuel is formed in a combustion chamber, a spark plug which ignites the air-fuel mixture, a programmable controller programmed to control supply proportions of the first fuel and the second fuel such that the ignited air-fuel mixture undergoes flame propagation combustion and then undergoes self-ignition combustion.

The details as well as other features and advantages of this invention are set forth in the remainder of the specification and are shown in the accompanying drawings.

DESCRIPTION OF THE PREFERRED EMBODIMENTS

Referring to FIG. 1-FIG. 6, a first embodiment of this invention will be described.

Figure 1:
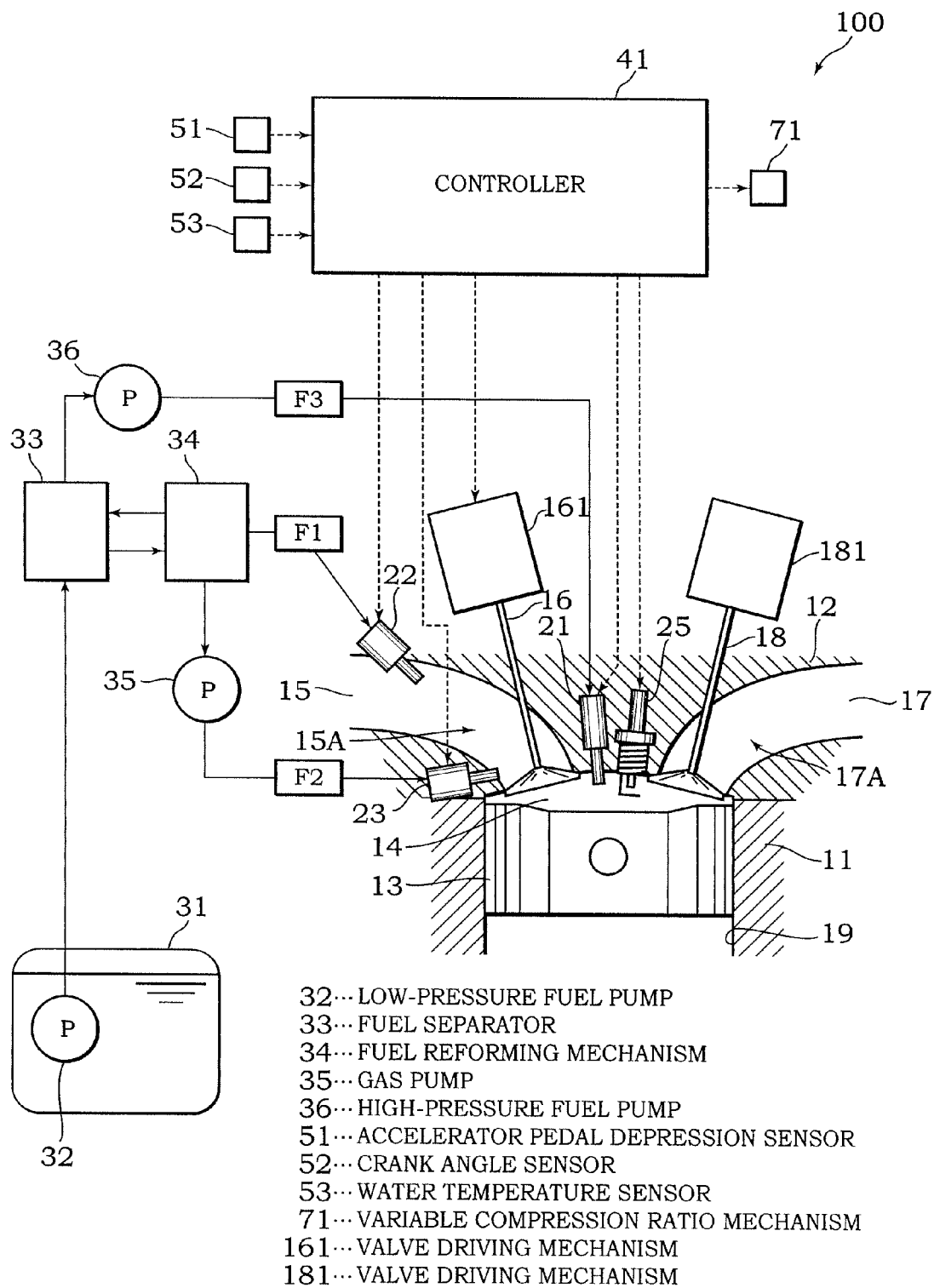
FIG. 1 is a schematic diagram of an internal combustion engine according to this invention.

Referring to FIG. 1, an internal combustion engine 100 for a vehicle comprises a cylinder block 11, and a cylinder head 12 disposed on an upper side of the cylinder block 11.

A cylinder 19 housing a piston 13 is formed in the cylinder block 11. A combustion chamber 14 is formed by a wall surface of the cylinder 19, a crown surface of the piston 13, and a lower surface of the cylinder head 12. When an air-fuel mixture is burned in the combustion chamber 14, the piston 13 receives combustion pressure and reciprocates through the interior of the cylinder 19.

An intake port 15A that communicates with an intake passage 15 and opens onto one side of the combustion chamber 14 is formed in the cylinder head 12. An intake valve 16 is provided in the intake port 15A. When the intake valve 16 is open, air from which dust particles and the like have been removed by an air cleaner is aspirated into the combustion chamber 14 through the intake port 15A.

An exhaust port 17A that communicates with an exhaust passage 17 and opens onto another side of the combustion chamber 14 is formed in the cylinder head 12. An exhaust valve 18 is provided in the exhaust port 17A. When the exhaust valve 18 is open, post-combustion exhaust gas is discharged from the combustion chamber 14 through the exhaust port 17A.

The intake valve 16 and exhaust valve 18 are opened and closed by respective valve driving mechanisms 161, 181. The valve driving mechanisms 161, 181 are constituted by camshafts having a fixed angular phase relative to a crankshaft of the internal combustion engine 100.

A fuel injection valve 21 is disposed in the cylinder head 12 near a cylinder center. A spark plug 25 is disposed in the cylinder head 12 adjacent to the fuel injection valve 21. In the internal combustion engine 100, two other fuel injection valves 22, 23 are provided in addition to the fuel injection valve 21 as means for supplying fuel. The fuel injection valves 22, 23 are both disposed in the cylinder head 12 so as to inject fuel into the intake port 15A.

Fuel having different properties is supplied to the respective fuel injection valves 21-23. Normal paraffin (to be referred to hereafter as n-paraffin) having high self-ignitability is supplied as a first fuel to the fuel injection valve 22, which is disposed in a position furthest removed from the combustion chamber 14. Hydrogen gas having a high combustion speed is supplied as a second fuel to the fuel injection valve 23, which is disposed in a position closer to the combustion chamber 14 than the fuel injection valve 22. Gasoline having a high octane value is supplied as a third fuel to the fuel injection valve 21, which is disposed in a central portion of the cylinder head 12.

The hydrogen gas has the highest combustion speed, while the combustion speeds of the gasoline and n-paraffin are substantially equal. The self-ignitability of the fuels decreases steadily in order of the n-paraffin, the gasoline, and the hydrogen gas.

Both the n-paraffin and the hydrogen gas are obtained using the gasoline as a raw material. The gasoline is stored in a fuel tank 31. The fuel tank 31 is provided with a low-pressure fuel pump 32. The gasoline in the fuel tank 31 is pumped by the low-pressure fuel pump 32 and supplied to a fuel separator 33.

In the fuel separator 33, the n-paraffin contained in the gasoline is membrane-separated. The separated n-paraffin is supplied to a fuel reforming mechanism 34.

The fuel reforming mechanism 34 is constituted by a device that extracts hydrogen from the n-paraffin by means of a dehydrogenation reaction using a catalyst. Of the n-paraffin supplied to the fuel reforming mechanism 34, a part is used in the dehydrogenation reaction, and the remainder is supplied to the fuel injection valve 22. In the fuel reforming mechanism 34, hydrogen is separated from a part of the supplied n-paraffin and extracted as hydrogen gas. The hydrogen gas is supplied to the fuel injection valve 23 by a gas pump 35. The n-paraffin used in the dehydrogenation reaction is transformed into a low self-ignitability fuel represented by an aroma component when hydrogen is separated therefrom. The aroma component is returned to the fuel separator 33. The aroma component is supplied to the fuel injection valve 21 by a high-pressure fuel pump 36 together with the gasoline that remains after the n-paraffin has been membrane-separated.

Injection amounts and timings of the fuel injection valves 21-23 and the ignition timing of the spark plug 25 are controlled by a controller 41. The controller 41 is constituted by a microcomputer having a central processing unit (CPU), read-only memory (ROM), random access memory (RAM), and an input/output interface (I/O interface).

The controller 41 performs the above control based on signals input from an accelerator pedal depression sensor 51 that detects the depression amount of an accelerator pedal provided in the vehicle, a crank angle sensor 52 that generates a crank angle signal at predetermined crank angle intervals of the internal combustion engine 100, and a water temperature sensor 53 that detects a cooling water temperature of the internal combustion engine 100.

Figure 2:
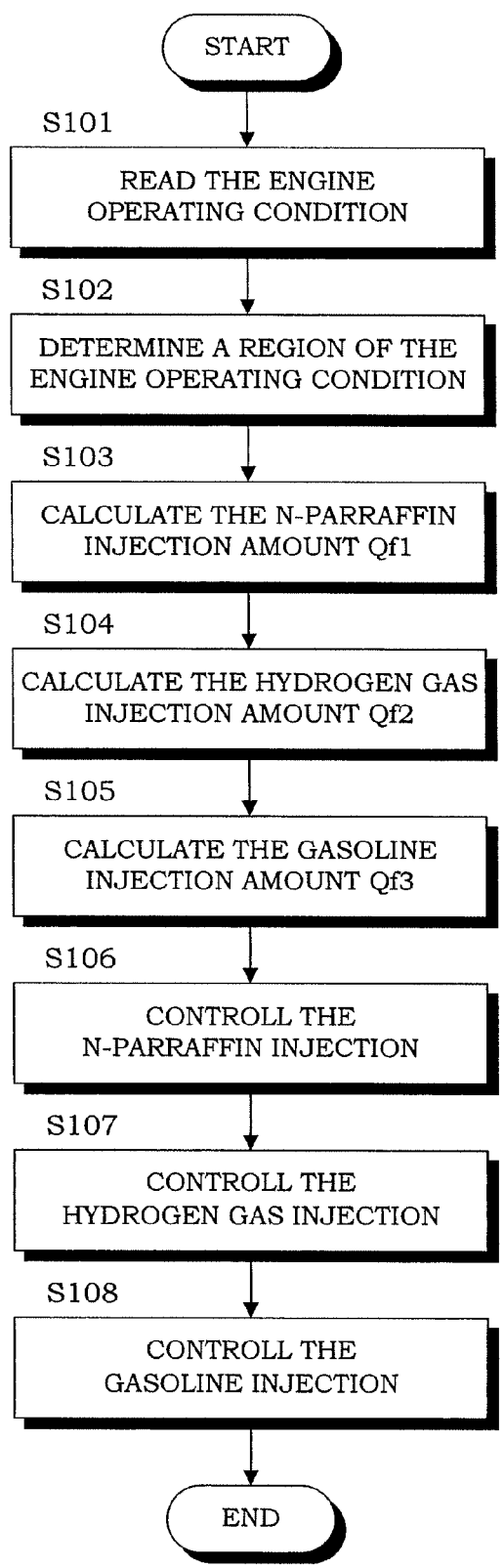
FIG. 2 is a flowchart illustrating a fuel injection control routine executed by a controller according to this invention.

Referring to FIG. 2, an operation of the controller 41 will be described. FIG. 2 is a flowchart illustrating a fuel injection control routine executed by the controller 41. This routine is executed repeatedly at fixed intervals, for example 10-millisecond, during an operation of the internal combustion engine 100.

In a step S101, the controller 41 reads an accelerator pedal depression amount APO, an engine rotation speed Ne, and a cooling water temperature Tw as an engine operating condition. The crank angle signal from the crank angle sensor 52 is used as a signal representing the engine rotation speed Ne of the internal combustion engine 100. The accelerator pedal depression amount APO is used as a signal representing an engine load Ld of the internal combustion engine 100.

In a step S102, the controller 41 determines a region to which the engine operating condition belongs. This determination is performed by referring to an operating region map such as that shown in FIG. 3. This operating region map is created in advance on the basis of the results of an experiment or the like, and stored in the ROM of the controller 41.

When the engine operating condition is in a low load/low rotation speed region A, a lean homogeneous air-fuel mixture is formed in the combustion chamber 14 using the three fuel injection valves 21-23. To form a homogeneous air-fuel mixture, the fuel injection valve 21 injects gasoline in an intake stroke, and the fuel injection valves 22, 23 inject n-paraffin and hydrogen gas, respectively, in an exhaust stroke. Conversely, when the engine operating condition is in a high load or high rotation speed region B, the fuel injection valves 22, 23 are not driven. A homogeneous air-fuel mixture having the stoichiometric air-fuel ratio is formed in the combustion chamber 14 by driving only the fuel injection valve 21 in the intake stroke to inject gasoline directly into the combustion chamber 14.

Returning to FIG. 2, in a step S103, the controller 41 calculates an n-paraffin injection amount Qf1 to be injected by the fuel injection valve 22 in accordance with the engine operating condition. When the engine operating condition is in the region B, operations of the fuel injection valves 22, 23 other than the fuel injection valve 21 that supplies the gasoline are stopped, and therefore the injection amount Qf1 is set at zero.

In a step S104, the controller 41 calculates a hydrogen gas injection amount Qf2 to be injected by the fuel injection valve 23 in accordance with the engine operating condition. When the engine operating condition is in the region B, the injection amount Qf2 is set at zero for the same reasons as the step S103.

In a step S105, the controller 41 calculates a gasoline injection amount Qf3 to be injected by the fuel injection valve 21 in accordance with the engine operating condition.

In a step S106, the controller 41 drives the fuel injection valve 22 at a predetermined timing within the exhaust stroke or the intake stroke such that n-paraffin is injected into the intake port 15A in the injection amount Qf1.

In a step S107, the controller 41 drives the fuel injection valve 23 at a predetermined timing within the exhaust stroke or the intake stroke such that hydrogen gas is injected into the intake port 15A in the injection amount Qf2.

In a step S108, the controller 41 drives the fuel injection valve 21 at a predetermined timing within the intake stroke such that gasoline is injected into the combustion chamber 14 in the injection amount Qf3.

Figure 4:
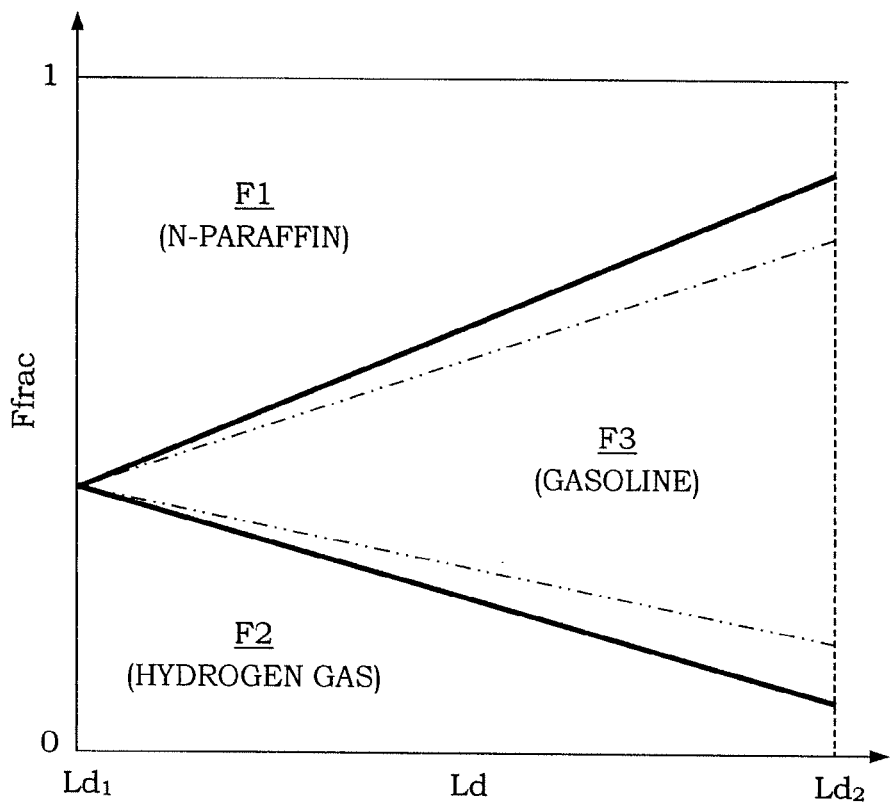
FIG. 4 is a diagram showing a ratio of generated heat amounts of n-paraffin, hydrogen gas, and gasoline supplied to the internal combustion engine, according to the fuel injection control routine performed by the controller.
Figure 5:
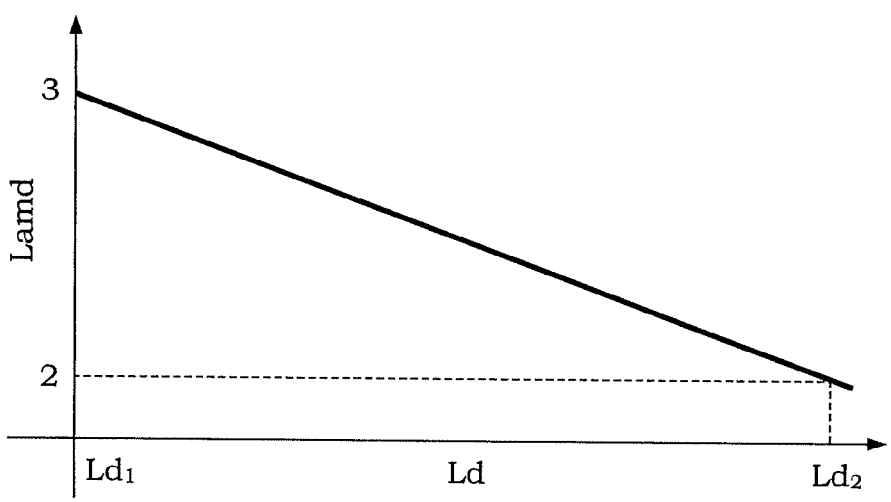
FIG. 5 is a diagram showing a relationship between an engine load and an excess air factor of an air-fuel mixture, according to the fuel injection control routine performed by the controller.
Figure 6:
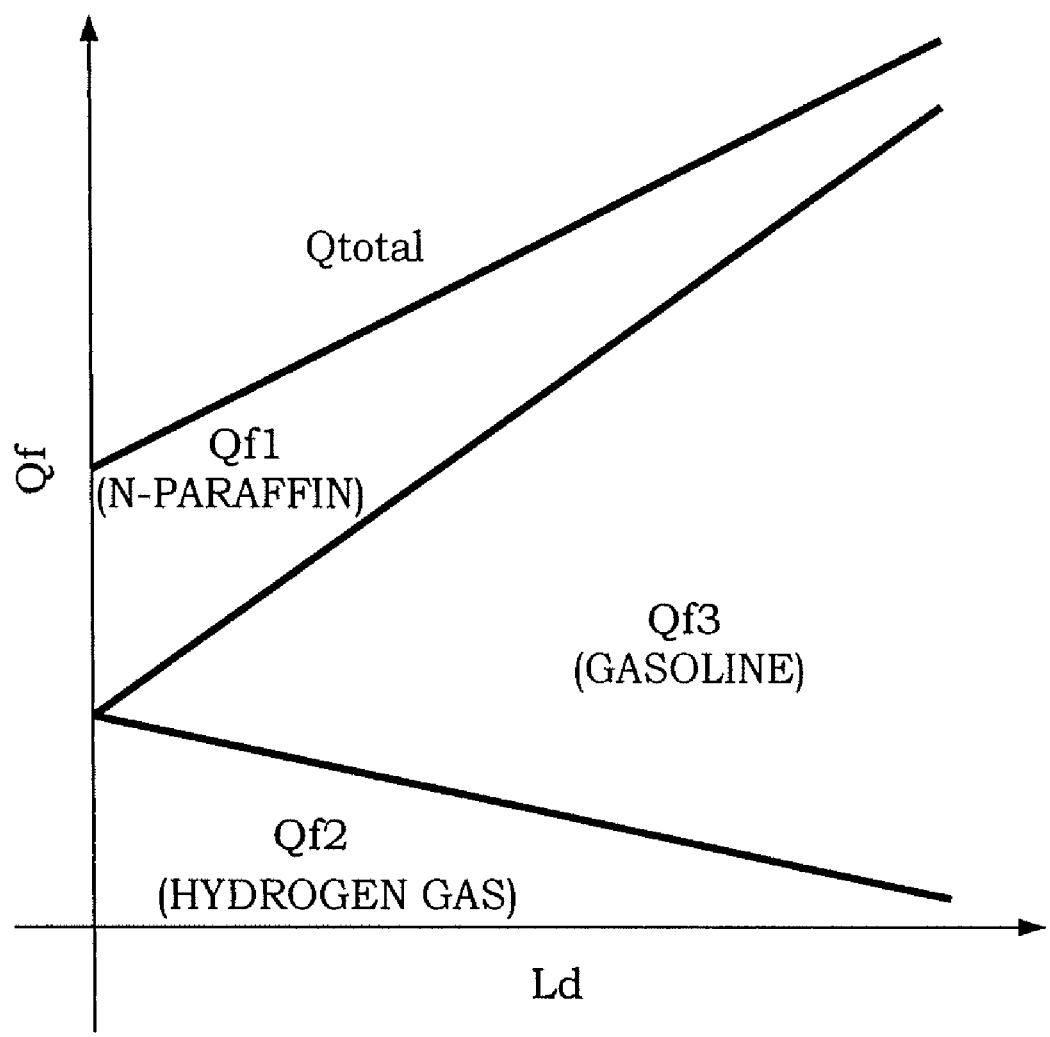
FIG. 6 is a diagram obtained by converting the diagram of FIG. 4 into fuel injection amounts of the n-paraffin, hydrogen gas, and gasoline.

Referring to FIG. 4-FIG. 6, the homogeneous air-fuel mixture formed in the combustion chamber 14 in the low load/low rotation speed region A will be described.

FIG. 4 shows the respective generated heat amount ratio (supply proportions) Ffrac of the n-paraffin, hydrogen gas, and gasoline within a total fuel injection amount Qtotal supplied to the combustion chamber 14 according to the fuel injection control performed by the controller 41. FIG. 5 shows a relationship between an engine load Ld and an excess air factor Lamd of the entire air-fuel mixture.

Referring to FIG. 5, the controller 41 increases the excess air factor Lamd as the engine load Ld decreases such that a leaner homogeneous air-fuel mixture is formed in the combustion chamber 14. With regard to the supply proportions Ffrac of the respective fuels, as shown in FIG. 4, the proportions of n-paraffin and hydrogen gas are increased and the proportion of gasoline is reduced as the engine load Ld decreases.

When the engine load Ld is a low load Ld1, the total fuel injection amount is determined such that the excess air factor Lamd reaches 3. In this case, the supply proportion Ffrac of the hydrogen gas is set at 0.4, and the supply proportion Ffrac of the n-paraffin is set at 0.6. When the engine load Ld is a high load Ld2, on the other hand, the total fuel injection amount is determined such that the excess air factor Lamd reaches 2. In this case, the supply proportion Ffrac of the hydrogen gas is set at 0.3, the supply proportion Ffrac of the n-paraffin is set at 0.21, and the supply proportion Ffrac of the gasoline is set at 0.49.

FIG. 6 shows the supply proportions Ffrac of the respective fuels shown in FIG. 4 converted into fuel injection amounts Qf correlating with generated heat amounts.

The excess air factor Lamd is increased as the engine load Ld decreases, and therefore the total fuel injection amount Qtotal decreases as the engine load Ld decreases, as shown in FIG. 6. However, the supply proportions of n-paraffin and hydrogen gas are increased in relation to a reduction in the engine load Ld, and therefore the respective injection amounts Qf1, Qf2 thereof increase irrespective of reductions in the engine load Ld. By adjusting the supply proportions of the three types of fuels having different combustion characteristics in the region A, the self-ignitability and combustion speed of the air-fuel mixture can be adjusted while maintaining the overall fuel concentration, or in other words maintaining the engine output, and therefore combustion having a desired characteristic can be realized.

Referring to FIG. 6, the controller 41 reduces the n-paraffin injection amount Qf1 as the engine load Ld increases, and therefore knocking is suppressed. Further, when the engine load Ld increases, the total fuel injection amount Qtotal also increases, and therefore ignition can be stabilized without depending on the hydrogen gas. Accordingly, the hydrogen gas injection amount Qf2 is decreased in relation to an increase in the engine load Ld. Hence, in the region A, combustion shifts gradually from a combustion mode promoting self-ignition combustion to spark ignition combustion as the engine load Ld increases.

In the internal combustion engine 100, combustion of the air-fuel mixture formed in the combustion chamber 14 is achieved in the following manner.

When the engine operating condition is in the low load/low rotation speed region A, the high self-ignitability n-paraffin and high combustion speed hydrogen gas are diffused throughout the entire combustion chamber 14 together with the gasoline to form a lean homogeneous air-fuel mixture. This homogeneous air-fuel mixture has high self-ignitability and a high combustion speed. When the homogeneous air-fuel mixture is ignited by the spark plug 25, the air-fuel mixture undergoes flame propagation combustion, despite being in a lean condition, due to the action of the high combustion speed hydrogen gas, and the flame expands to the air-fuel mixture in the combustion chamber 14. During the flame propagation combustion, an unburned part of the air-fuel mixture is compressed by combustion expansion, and due to the action of the high self-ignitability n-paraffin, the unburned air-fuel mixture achieves self-ignition combustion. Hence, in the internal combustion engine 100, the homogeneous air-fuel mixture in the combustion chamber 14 is subjected to flame propagation combustion in the former half of combustion, and self-ignition combustion in the latter half of combustion.

When the engine operating condition is in the high load or high rotation speed region B, on the other hand, gasoline is injected such that the stoichiometric air-fuel ratio is achieved, whereby a homogeneous air-fuel mixture is formed in the combustion chamber 14. This homogeneous air-fuel mixture is ignited by the spark plug 25 and undergoes flame propagation combustion.

With the internal combustion engine 100 described above, the following effects can be obtained.

In the internal combustion engine 100, the supply proportions of the high self-ignitability n-paraffin and high combustion speed hydrogen gas are adjusted such that the ignited air-fuel mixture undergoes flame propagation combustion and then self-ignition combustion, and thus a homogeneous air-fuel mixture containing n-paraffin and hydrogen gas is formed in the combustion chamber 14. Therefore, the homogeneous air-fuel mixture in the combustion chamber 14 undergoes flame propagation combustion in the former half of the combustion due to the action of the hydrogen gas, and undergoes self-ignition combustion in the latter half of combustion due to the action of the n-paraffin. Self-ignition combustion of the air-fuel mixture is promoted by the n-paraffin, and therefore stable self-ignition combustion can be achieved even during low load conditions. As a result, high thermal efficiency can be realized.

Further, the lean homogeneous air-fuel mixture is ignited by the spark plug 25, but since hydrogen gas is a fuel having a higher combustion speed than gasoline, combustion can be performed without misfire of the air-fuel mixture due to the action of the hydrogen gas. Therefore, deteriorations in emissions can be suppressed without the need to form an air-fuel mixture mass having a high fuel concentration and cause this air-fuel mixture to self-ignite, as in the prior art.

Furthermore, due to the action of the high combustion speed hydrogen gas, the flame of the burning air-fuel mixture expands quickly through the entire combustion chamber 14. Therefore, the compression action generated through combustion expansion can be obtained quickly throughout the entire combustion chamber 14, including the region near the wall surface of the combustion chamber 14. As a result, the air-fuel mixture can be caused to undergo self-ignition combustion throughout the entire combustion chamber 14, and unburned fuel discharge to the outside can be suppressed.

It should be noted that in this embodiment, the supply proportions Ffrac of n-paraffin and hydrogen gas within the total fuel injection amount Qtotal may be modified in accordance with the cooling water temperature Tw. As shown by double dotted lines in FIG. 4, during a cold period when the cooling water temperature Tw is low, the supply proportions Ffrac of n-paraffin and hydrogen gas are increased in comparison with a case in which engine warm-up is complete, shown by solid lines. As a result of this adjustment, the combustion speed and self-ignitability of the air-fuel mixture can be maintained irrespective of the warm-up condition of the internal combustion engine 100, and therefore combustion can be stabilized.

Figure 7:
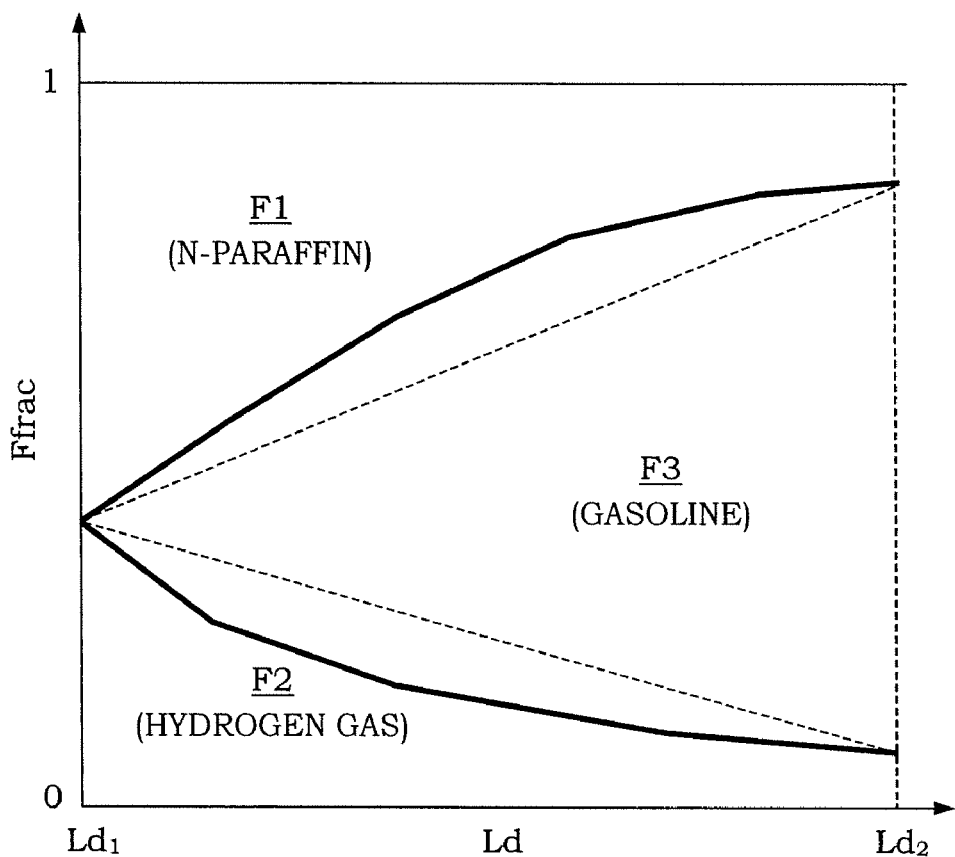
FIG. 7 is a diagram showing a ratio of the generated heat amounts of the n-paraffin, hydrogen gas, and gasoline when supplied to the internal combustion engine in a cold condition, according to the fuel injection control routine performed by the controller.
Figure 8:
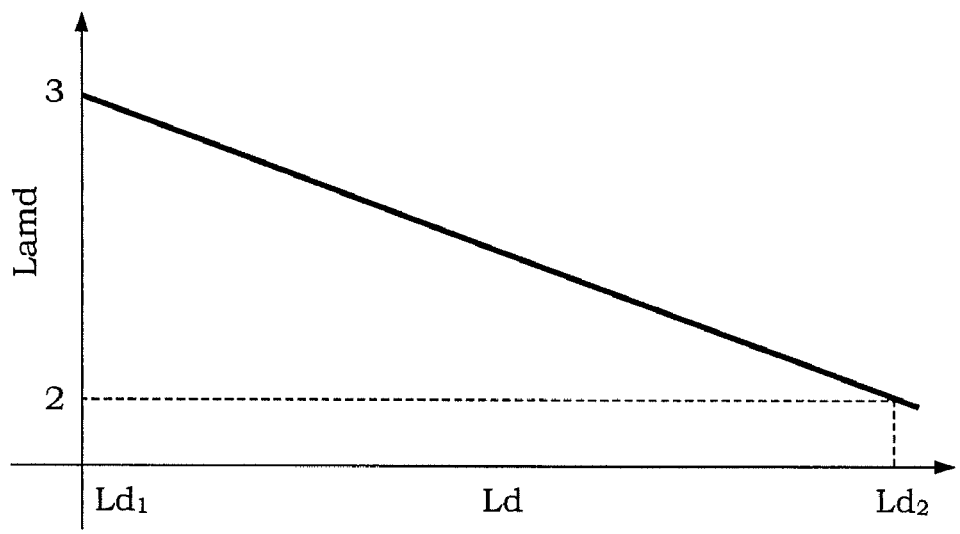
FIG. 8 is a diagram showing the relationship between the engine load and the excess air factor of the air-fuel mixture in the internal combustion engine in a cold condition, according to the fuel injection control routine performed by the controller.

Referring to FIG. 7, the supply proportions Ffrac of the respective fuels do not have to be increased linearly relative to reductions in the engine load Ld, and may be increased in quadratic function form. The respective supply proportions of the n-paraffin and hydrogen gas are increased by enlarging the change rate to the engine load Ld as the engine load Ld decreases. In this case also, the excess air factor Lamd is increased as the engine load Ld decreases, as shown in FIG. 8.

Referring to FIG. 9-FIG. 14, a second embodiment of this invention will be described.

The internal combustion engine 100 according to this embodiment differs from the first embodiment in the constitutions of the combustion chamber, fuel system, and the content of control thereof. Other constitutions of the internal combustion engine 100 are identical to their counterparts in the first embodiment.

Figure 9:
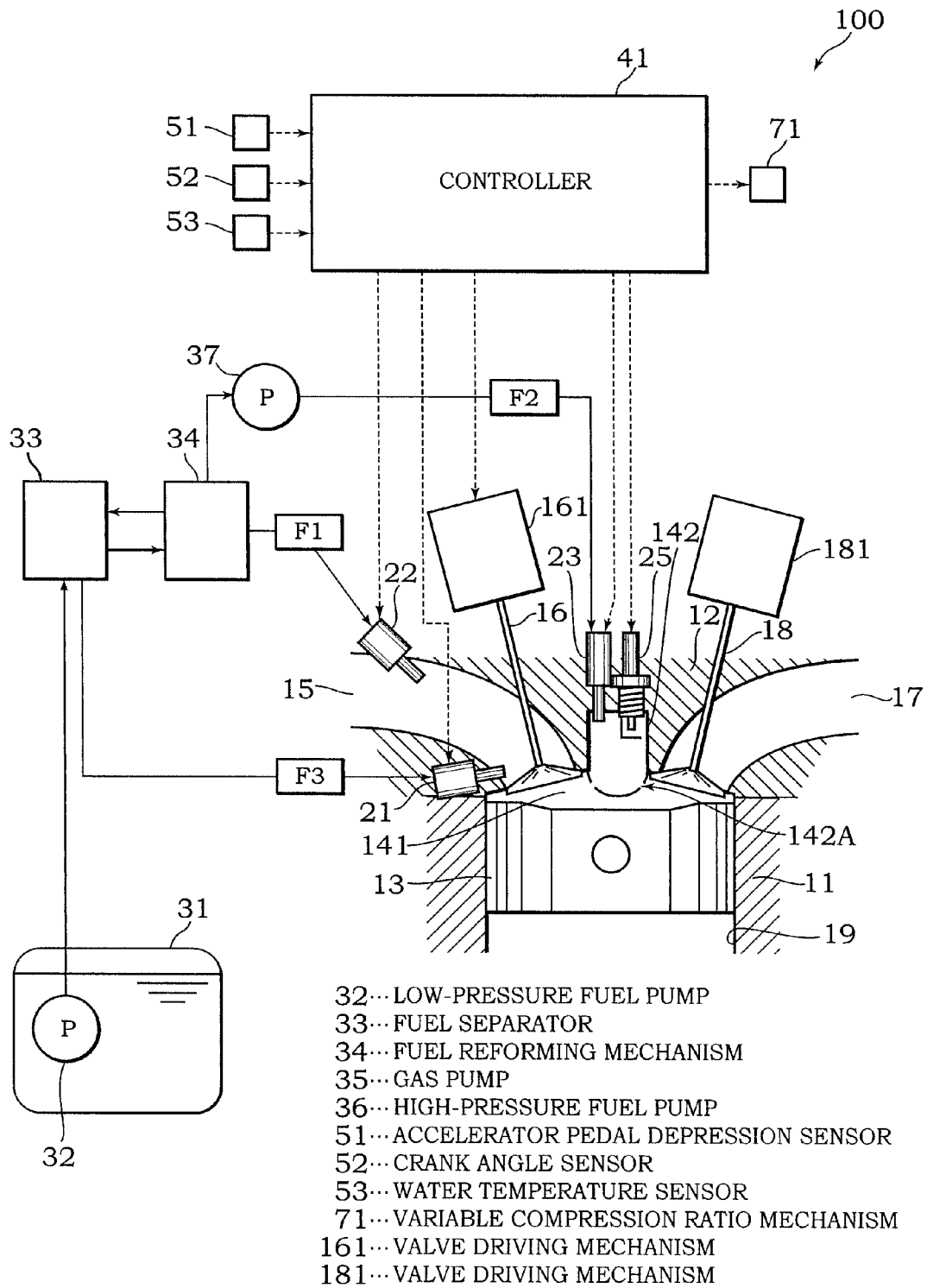
FIG. 9 is a schematic diagram of an internal combustion engine according to a second embodiment of this invention.

Referring to FIG. 9, the internal combustion engine 100 comprises a main combustion chamber 141 defined by the wall surface of the cylinder 19, the cylinder head 12 and the piston 13, and a fixed-volume auxiliary combustion chamber 142 separated from the main combustion chamber 141 and connected thereto via injection holes 142A. The auxiliary combustion chamber 142 forms a flame torch that spouts out the main combustion chamber 141 through each of the injection holes 142A when an air-fuel mixture in the auxiliary combustion chamber 142 is burned.

The internal combustion engine 100 comprises the fuel injection valves 21-23 as means for supplying fuel. The fuel injection valve 23 is disposed in the cylinder head 12 in the vicinity of the cylinder center. The fuel injection valve 23 injects hydrogen gas having a high combustion speed into the auxiliary combustion chamber 142. The fuel injection valves 21, 22 are both disposed in the cylinder head 12 so as to inject fuel into the intake port 15A of the intake passage 15. The fuel injection valve 21 injects gasoline having a high octane value. The fuel injection valve 22 injects n-paraffin having high self-ignitability.

Similarly to the first embodiment, the n-paraffin and hydrogen gas are both obtained using the gasoline as a raw fuel. The gasoline serving as the raw fuel is stored in the fuel tank 31.

Figure 10:
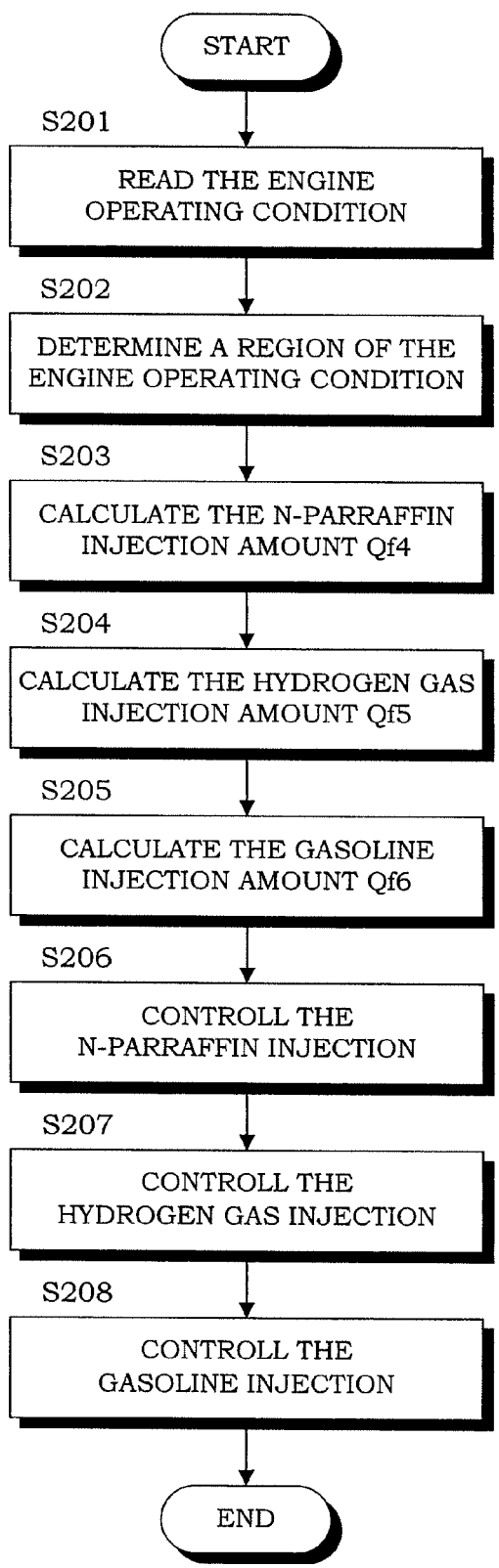
FIG. 10 is a flowchart illustrating a fuel injection control routine executed by a controller according to the second embodiment of this invention.

Referring to FIG. 10, a fuel injection control routine executed by the controller 41 in this embodiment will be described. The controller 41 executes this control in place of the control routine shown in FIG. 2.

In a step S201, the controller 41 reads the accelerator pedal depression amount APO, engine rotation speed Ne, and cooling water temperature Tw as the engine operating condition.

Figure 3:
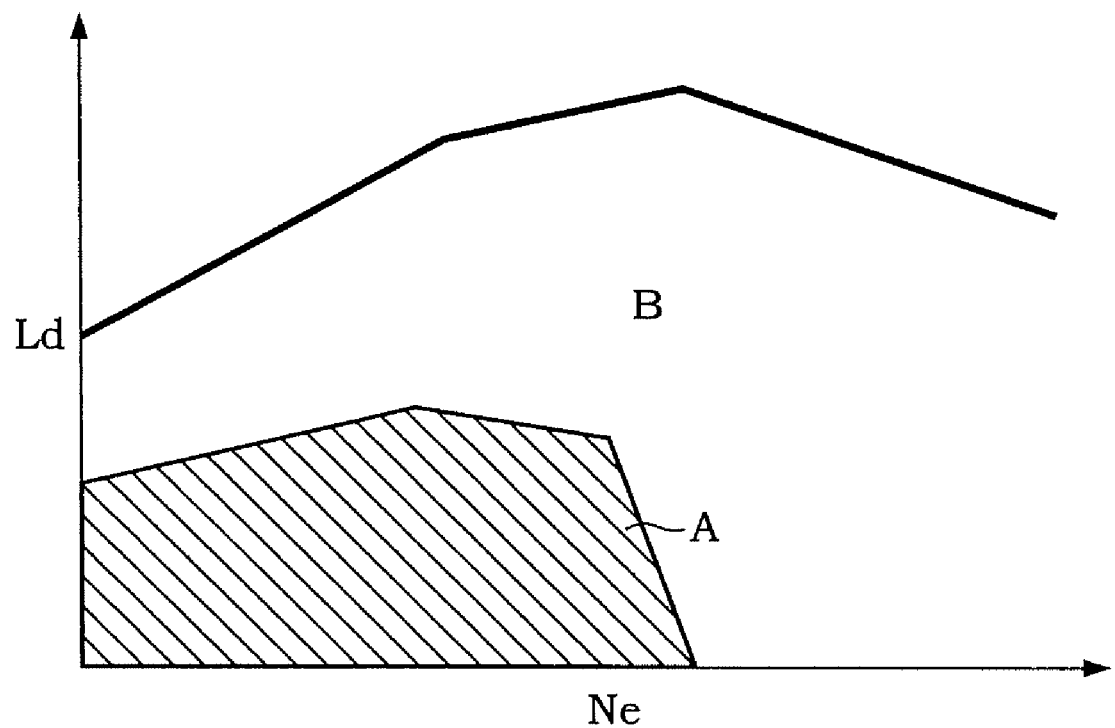
FIG. 3 is a diagram illustrating the content of a map of an engine operating condition, which is stored by the controller according to this invention.

In a step S202, the controller 41 determines a region to which the engine operating condition belongs, by referring to the operation region map shown in FIG. 3.

When the engine operating condition is in the low load/low rotation speed region A of FIG. 3, a lean homogeneous air-fuel mixture containing gasoline and n-paraffin is formed in the main combustion chamber 141 using the fuel injection valves 21, 22, and hydrogen gas is injected into the auxiliary combustion chamber 142 by the fuel injection valve 23. In the compression stroke, the lean homogeneous air-fuel mixture formed in the main combustion chamber 141 flows into the auxiliary combustion chamber 142 as the piston 13 rises, and therefore an air-fuel mixture containing n-paraffin, gasoline and hydrogen gas is formed in the auxiliary combustion chamber 142. When the engine operating condition is in the high load or high rotation speed region B, on the other hand, a homogeneous air-fuel mixture having the stoichiometric air-fuel ratio is formed in the main combustion chamber 141 using the fuel injection valve 21 alone.

In a step S203, the controller 41 calculates an n-paraffin injection amount Qf4 to be injected by the fuel injection valve 22 in accordance with the engine operating condition. When the engine operating condition is in the region B, the injection amount Qf4 is set at zero.

In a step S204, the controller 41 calculates a hydrogen gas injection amount Qf5 to be injected by the fuel injection valve 23 in accordance with the engine operating condition. When the engine operating condition is in the region B, the injection amount Qf5 is set at zero.

In a step S205, the controller 41 calculates a gasoline injection amount Qf6 to be injected by the fuel injection valve 21 in accordance with the engine operating condition.

In a step S206, the controller 41 drives the fuel injection valve 22 at a predetermined timing within the exhaust stroke or the intake stroke such that n-paraffin is injected into the intake port 15A in the injection amount Qf4.

In a step S207, the controller 41 drives the fuel injection valve 23 at a predetermined timing within the compression stroke such that hydrogen gas is injected into the auxiliary combustion chamber 142 in the injection amount Qf5.

In a step S208, the controller 41 drives the fuel injection valve 21 at a predetermined timing within the exhaust stroke or the intake stroke such that gasoline is injected into the intake port 15A in the injection amount Qf6.

Figure 11:
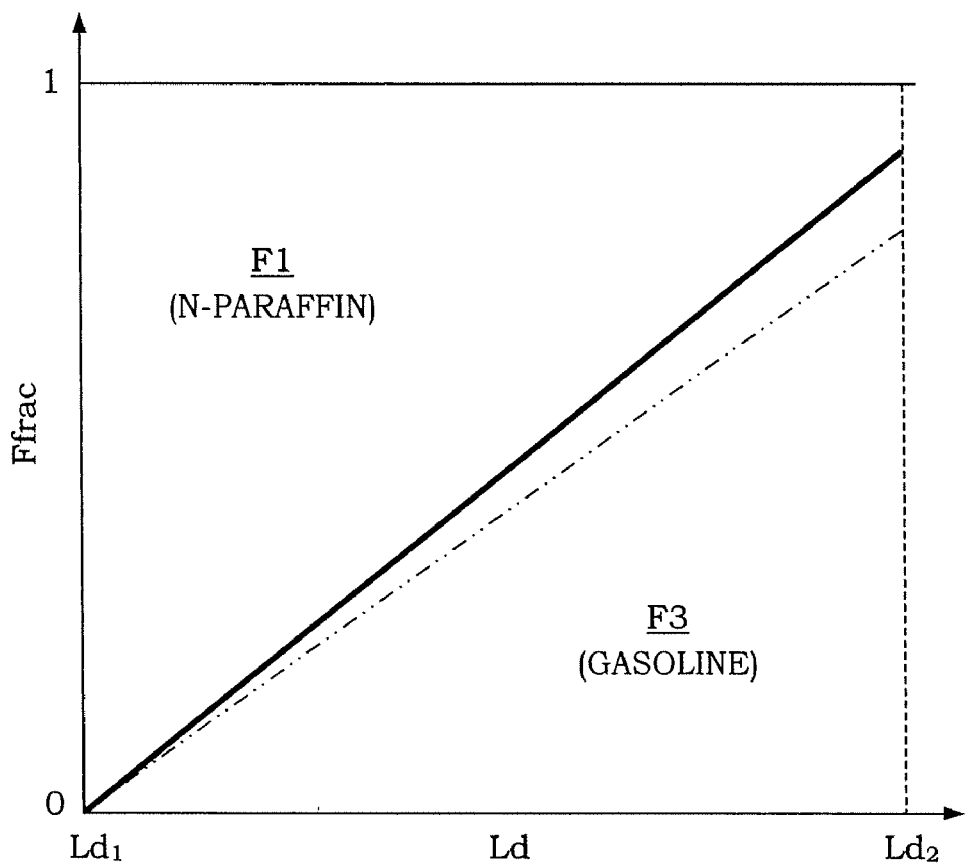
FIG. 11 is a diagram showing a ratio of generated heat amounts of n-paraffin and gasoline supplied to the internal combustion engine, according to the fuel injection control routine performed by the controller according to the second embodiment of this invention.
Figure 12:
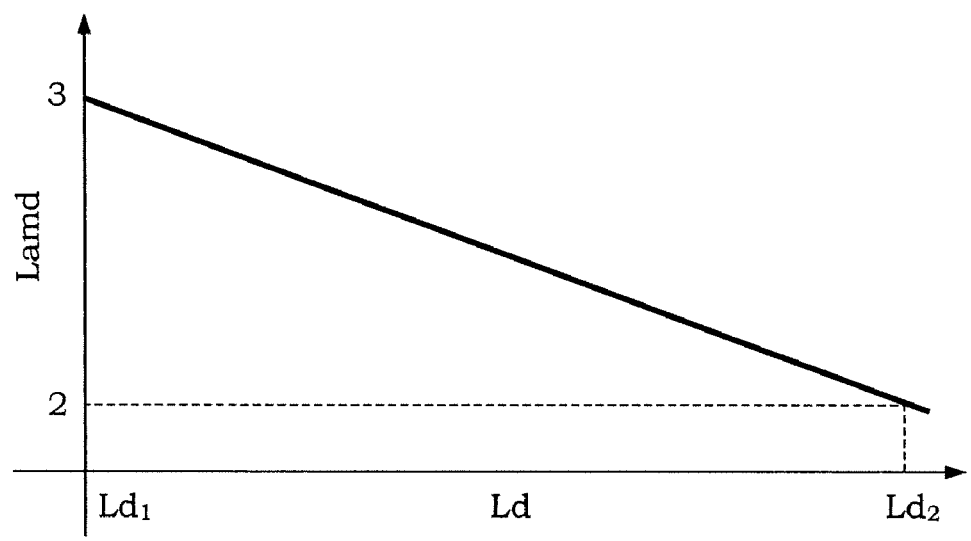
FIG. 12 is a diagram showing a relationship between an engine load and an excess air factor of an air-fuel mixture, according to on the fuel injection control routine performed by the controller according to the second embodiment of this invention.
Figure 13:
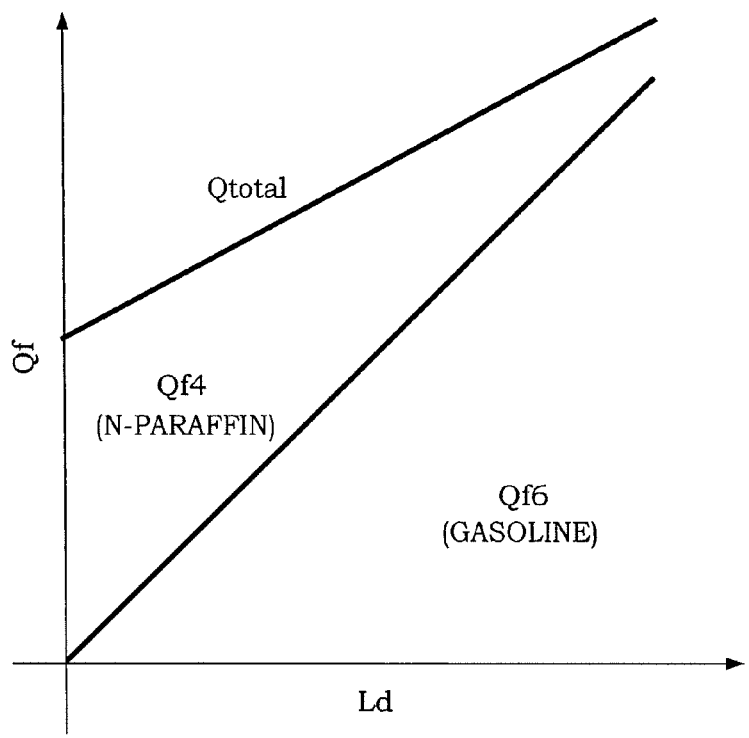
FIG. 13 is a diagram obtained by converting the diagram of FIG. 11 into fuel injection amounts of the n-paraffin and gasoline.

Referring to FIG. 11-FIG. 13, the homogeneous air-fuel mixture formed in the main combustion chamber 141 in the low load/low rotation speed region A will be described. Further, referring to FIG. 14, the hydrogen gas injected into the auxiliary combustion chamber 142 will be described.

FIG. 11 shows the respective generated heat amount ratio (supply proportions) Ffrac of the n-paraffin and gasoline within a total fuel injection amount Qtotal supplied to the main combustion chamber 141, according to the fuel injection control performed by the controller 41. In this embodiment, since the hydrogen gas is injected into the auxiliary combustion chamber 142 separated from the main combustion chamber 141, and hence the hydrogen gas excluded from the total fuel injection amount Qtotal. FIG. 12 shows a relationship between the engine load Ld and the excess air factor Lamd of the entire air-fuel mixture.

Referring to FIG. 12, the controller 41 increases the excess air factor Lamd as the engine load Td decreases. As a result, combustion is performed with a lean homogeneous air-fuel mixture. With this air-fuel mixture, the supply proportion Ffrac of the n-paraffin increases as the engine load Ld decreases, as shown in FIG. 11. Conversely, the supply proportion Ffrac of the gasoline decreases as the engine load Ld decreases.

When the engine load Ld is the low load Ld1, the controller 41 determines the total fuel injection amount such that the excess air factor Lamd reaches 3. In this case, the supply proportion Ffrac of the n-paraffin is set at 1.0, and the supply proportion Ffrac of the gasoline is set at 0. When the engine load Ld is the high load Ld2, on the other hand, the controller 41 determines the total fuel injection amount such that the excess air factor Lamd reaches 2. In this case, the supply proportion Ffrac of the n-paraffin is set at 0.3, and the supply proportion Ffrac of the gasoline is set at 0.7.

FIG. 13 shows the supply proportions Ffrac of the respective fuels shown in FIG. 11 converted into fuel injection amounts Qf correlating with the generated heat amounts.

The excess air factor Lamd is increased as the engine load Ld decreases, and therefore the total fuel injection amount Qtotal decreases as the engine load Ld decreases, as shown in FIG. 13. However, the controller 41 increases the ratio of n-paraffin relative to a reduction in the engine load Ld, and therefore the n-paraffin injection amount Qf4 increases as the engine load Ld decreases. Thus, with the homogeneous air-fuel mixture formed in the main combustion chamber 141, the self-ignitability that is obtained by the action of the n-paraffin can be adjusted.

Figure 14:
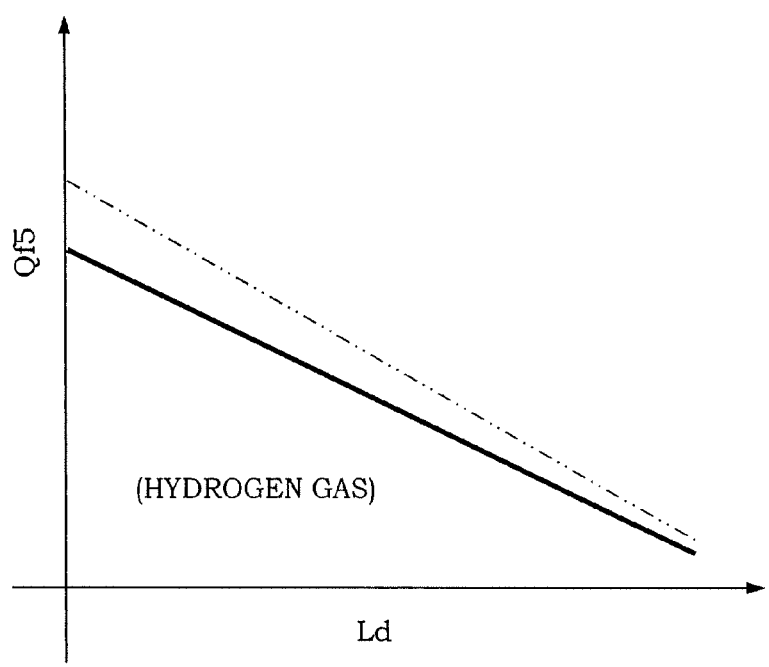
FIG. 14 is a diagram showing a fuel injection amount of hydrogen gas supplied to the internal combustion engine, according to the fuel injection control routine performed by the controller according to the second embodiment of this invention.

Referring to FIG. 14, the hydrogen gas injection amount Qf5 injected into the auxiliary combustion chamber 142 is adjusted in accordance with the engine load Ld. The hydrogen gas injection amount Qf5 is increased as the engine load Ld decreases. By means of the action of the hydrogen gas, the combustion speed of the air-fuel mixture formed in the auxiliary combustion chamber 142 can be adjusted.

In the internal combustion engine 100, combustion of the air-fuel mixture formed in the main combustion chamber 141 is achieved in the following manner.

When the engine operating condition is in the region A, the high self-ignitability n-paraffin is diffused throughout the entire main combustion chamber 141 together with the gasoline to form a homogeneous air-fuel mixture. In the compression stroke, the air-fuel mixture in the main combustion chamber 141 flows into the auxiliary combustion chamber 142 through the injection holes 142A as the piston 13 rises. The air-fuel mixture that flows into the auxiliary combustion chamber 142 from the main combustion chamber 141 is lean. Since the high combustion speed hydrogen gas is supplied to the auxiliary combustion chamber 142, the ignitability of the air-fuel mixture in the auxiliary combustion chamber 142 is secured. When the air-fuel mixture in the auxiliary combustion chamber 142 is ignited by the spark plug 25, the air-fuel mixture in the auxiliary combustion chamber 142 undergoes flame propagation combustion due to the action of the hydrogen gas, even when the air-fuel mixture that flows into the auxiliary combustion chamber 142 from the main combustion chamber 141 is lean. As a result of this combustion, a flame torch that spouts out the main combustion chamber 141 through each of the injection holes 142A is formed. Due to the action of the high combustion speed hydrogen gas, The flame torch expands quickly through the entire main combustion chamber 141. The supply proportions of the high self-ignitability n-paraffin and the high combustion speed hydrogen gas are adjusted so that the air-fuel mixture in the main combustion chamber 141 is caused to undergo flame propagation combustion by the flame torch, and then caused to undergo self-ignition combustion. Hence, the homogeneous air-fuel mixture in the main combustion chamber 141 is ignited by the flame torch so as to undergo flame propagation combustion, and then undergoes self-ignition combustion as a result of combustion expansion.

When the engine operating condition is in the region B, gasoline is injected in an amount corresponding to the stoichiometric air-fuel ratio, whereby a homogeneous air-fuel mixture having the stoichiometric air-fuel ratio is formed in the main combustion chamber 141. In the compression stroke, a part of this homogeneous air-fuel mixture flows into the auxiliary combustion chamber 142 through each of the injection holes 142A. When the air-fuel mixture in the auxiliary combustion chamber 142 is ignited by the spark plug 25, the air-fuel mixture in the auxiliary combustion chamber 142 undergoes flame propagation combustion. A flame torch is injected into the main combustion chamber 141 through each of the injection holes 142A. As a result of this flame torch, the air-fuel mixture in the main combustion chamber 141 undergoes flame propagation combustion.

With the internal combustion engine 100 according to the second embodiment described above, the following effects can be obtained.

In the internal combustion engine 100, the homogeneous air-fuel mixture formed in the main combustion chamber 141 is ignited by the flame torch. The self-ignitability of this air-fuel mixture is promoted by the action of the n-paraffin, and therefore stable self-ignition combustion can be achieved, whereby similar favorable effects to those of the first embodiment can be obtained.

Further, n-paraffin is a fuel having high self-ignitability, and hence there is no need to form a powerful flame torch to cause the air-fuel mixture in the main combustion chamber 141 to undergo self-ignition combustion. Therefore, disturbances in the interior of the main combustion chamber 141 caused by the flame torch can be suppressed, and a reduction in thermal efficiency due to cooling loss can be avoided.

Moreover, by supplying the high combustion speed hydrogen gas to the auxiliary combustion chamber 142, the ignitability of the air-fuel mixture in the auxiliary combustion chamber 142 can be improved such that even more stable combustion can be realized. The hydrogen gas injection amount Qf5 is increased in relation to a reduction in the engine load Ld, and therefore the ignitability of the air-fuel mixture in the auxiliary combustion chamber 142 can be maintained regardless of the engine load Ld. Hence, the air-fuel mixture in the main combustion chamber 141 can be caused to undergo self-ignition combustion with stability.

Similarly to the first embodiment, the supply proportion Ffrac of n-paraffin in the total fuel injection amount Qtotal may be modified in accordance with the cooling water temperature Tw. As shown by a double dotted line in FIG. 11, during a cold period when the cooling water temperature Tw is low, the supply proportion Ffrac of n-paraffin is increased in comparison with a case in which engine warm-up is complete, shown by a solid line.

As shown by a double dotted line in FIG. 14, during a cold period, the hydrogen gas supply amount Qf5 may be increased in comparison with a case shown by a solid line, as well as, or instead of, modifying the supply proportion of n-paraffin.

Referring to FIG. 15, FIG. 16, FIGS. 17A and 17B, and FIGS. 18A and 18B, a third embodiment of this invention will be described.

The internal combustion engine 100 according to this embodiment is substantially identical to that of the first embodiment, but differs therefrom in that the controller 41 performs fuel injection control such that combustion in the low load/low rotation speed region A is further stabilized. More specifically, the injection amounts of the respective fuels are corrected in accordance with the combustion condition of the air-fuel mixture, and the following description will center on this difference.

Figure 15:
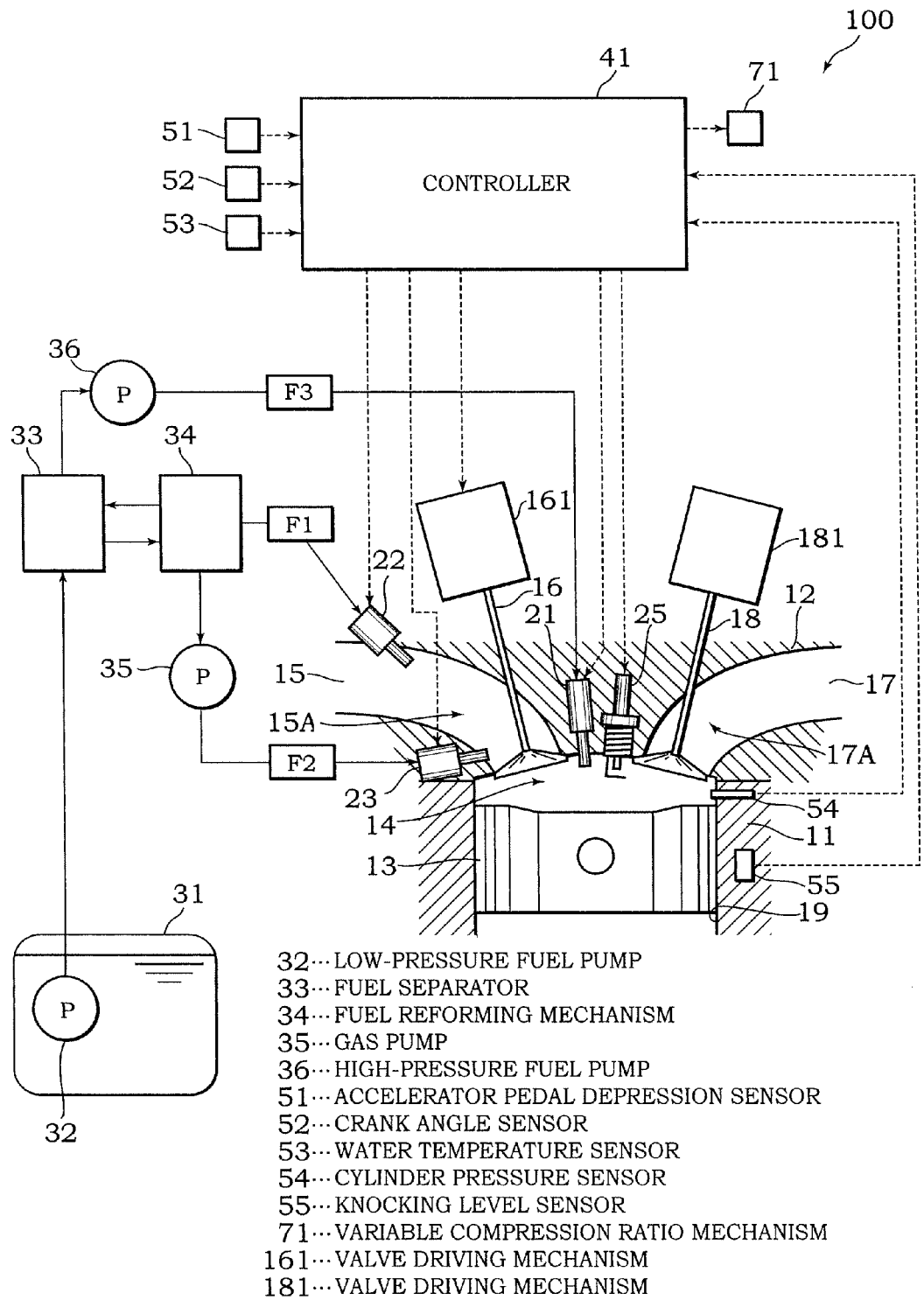
FIG. 15 is a schematic diagram of an internal combustion engine according to a third embodiment of this invention.

Referring to FIG. 15, the internal combustion engine 100 comprises a cylinder pressure sensor 54 and a knocking level sensor 55.

The cylinder pressure sensor 54 is provided in the cylinder block 11 to detect the internal pressure of the combustion chamber 14. A detection signal from the cylinder pressure sensor 54 is input into the controller 41.

The knocking level sensor 55 is disposed in the cylinder block 11 to detect vibration generated in an engine main body. A detection signal from the knocking level sensor 55 is input into the controller 41.

On the basis of the detection signals from the cylinder pressure sensor 54 and knocking level sensor 55, the controller 41 determines the combustion condition of the air-fuel mixture in the low load/low rotation speed region A. The controller 41 corrects the injection amounts Qf1-Qf3 of the respective fuels in accordance with the combustion condition.

A fuel injection amount correction control routine executed by the controller 41 in the region A will now be described with reference to FIG. 16, FIGS. 17A and 17B, and FIGS. 18A and 18B.

Figure 16:
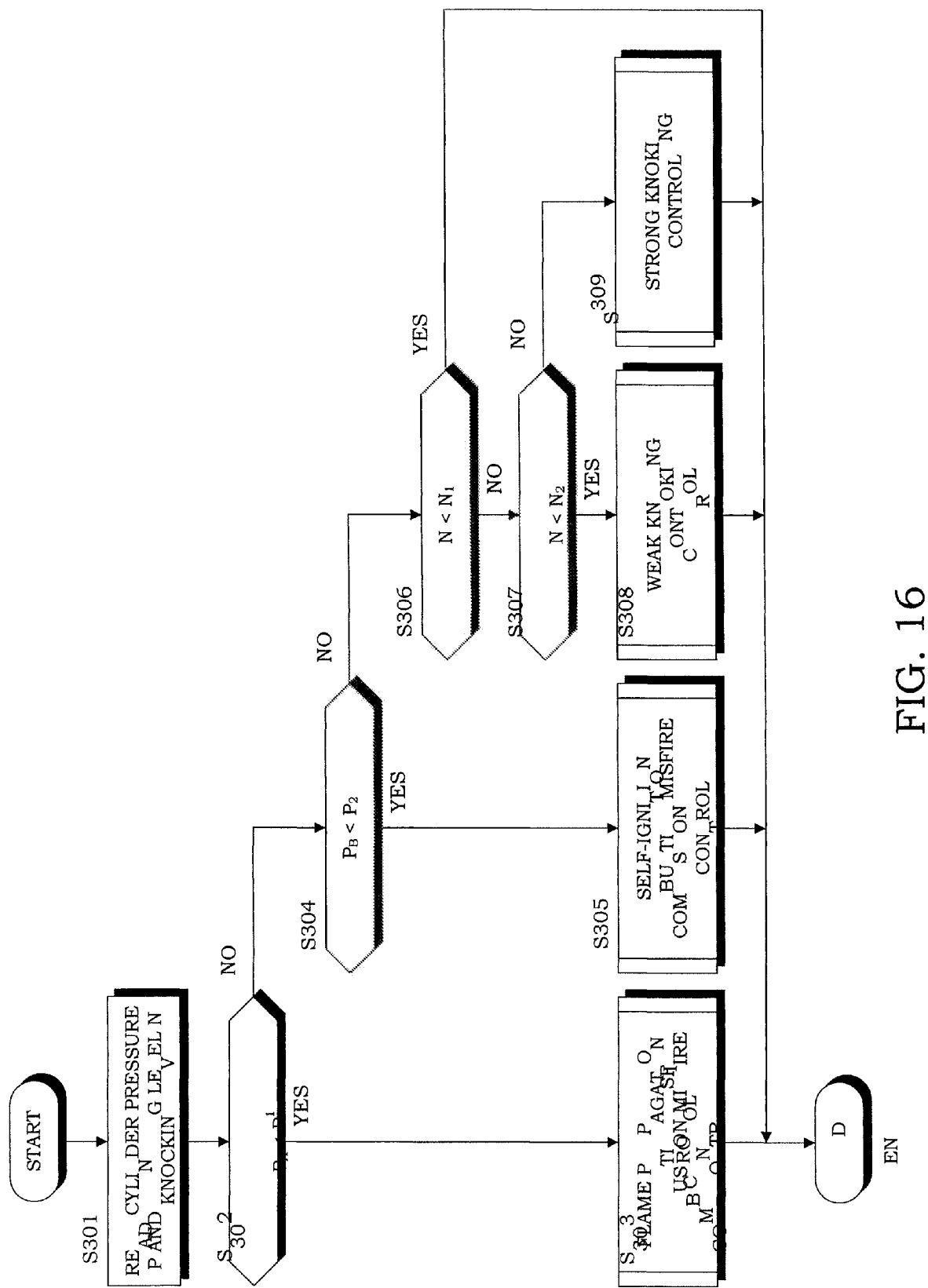
FIG. 16 is a flowchart illustrating a fuel injection amount correction control routine executed by a controller according to the third embodiment of this invention.

FIG. 16 is a flowchart showing the fuel injection amount correction control routine executed by the controller 41. This routine is executed at fixed intervals, for example a 10-millisecond, while the engine operating condition is in the region A.

In a step S301, the controller 41 reads a cylinder pressure P and a knocking level N as the engine operating condition. The cylinder pressure P is calculated on the basis of the detection signal from the cylinder pressure sensor 54. The knocking level N is calculated on the basis of a vibration amount detected by the knocking level sensor 55. The calculated cylinder pressure P and knocking level N are stored in the ROM of the controller 41 as time-related values (waveforms), for example, and in each of the subsequent steps, the cylinder pressure P and knocking level N during a flame propagation combustion period or a self-ignition combustion period are read.

In a step S302, the controller 41 determines whether or not a cylinder pressure $P_A$ during flame propagation combustion of the homogeneous air-fuel mixture in the combustion chamber 14 is smaller than a reference pressure $P_1$. When the cylinder pressure $P_A$ is smaller than the reference pressure $P_1$, it is determined that a misfire has occurred during the flame propagation combustion of the former half of combustion, and the processing advances to a step S303. When the cylinder pressure $P_A$ is larger than the reference pressure $P_1$, on the other hand, it is determined that flame propagation combustion has been achieved without a misfire, and the processing advances to a step S304.

It should be noted that a cylinder pressure in the vicinity of piston top dead center in the expansion stroke is detected as the cylinder pressure $P_A$ during flame propagation combustion.

In the step S303, the controller 41 executes a flame propagation combustion misfire control subroutine to suppress misfires during flame propagation combustion. This flame propagation combustion misfire control subroutine will be described later with reference to FIG. 17A.

In the step S304, the controller 41 determines whether or not a cylinder pressure $P_B$ during self-ignition combustion of the air-fuel mixture in the combustion chamber 14 is smaller than a reference pressure $P_2$. The reference pressure $P_2$ is set at a larger value than the reference pressure $P_1$. When the cylinder pressure $P_B$ is smaller than the reference pressure $P_2$, it is determined that a misfire has occurred during the self-ignition combustion of the latter half of combustion, and the processing advances to a step S305. When the cylinder pressure $P_B$ is larger than the reference pressure $P_2$, on the other hand, it is determined that self-ignition combustion has been achieved without a misfire, and the processing advances to a step S306.

It should be noted that a cylinder pressure in the vicinity of 15° after piston top dead center in the expansion stroke is detected as the cylinder pressure $P_B$ during self-ignition combustion.

In the step S305, the controller 41 executes a self-ignition combustion misfire control subroutine to suppress misfires during self-ignition combustion. This self-ignition combustion misfire control subroutine will be described later with reference to FIG. 17B.

In the step S306 and a step S307, the controller 41 determines a knocking generation condition.

In the step S306, the controller 41 determines whether or not the knocking level N is smaller than a reference value $N_1$. When the knocking level N is smaller than the reference value $N_1$, it is determined that knocking has not occurred, and the routine is terminated. When the knocking level N is larger than the reference value $N_1$, on the other hand, it is determined that knocking is occurring, and the processing advances to the step S307.

In the step S307, the controller 41 determines whether or not the knocking level N is smaller than a reference value $N_2$. The reference value $N_2$ is set at a larger value than the reference value $N_1$. When the knocking level N is smaller than the reference value $N_2$, it is determined that weak knocking is occurring, and the processing advances to a step S308. When the knocking level N is larger than the reference value $N_2$, on the other hand, it is determined that stronger knocking than the weak knocking is occurring, and the processing advances to a step S309.

In the step S308, the controller 41 executes a weak knocking control subroutine to suppress weak knocking. This weak knocking control subroutine will be described later with reference to FIG. 18A.

In the step S309, the controller 41 executes a strong knocking control subroutine to suppress strong knocking. This strong knocking control subroutine will be described later with reference to FIG. 18B.

Figure 17A:
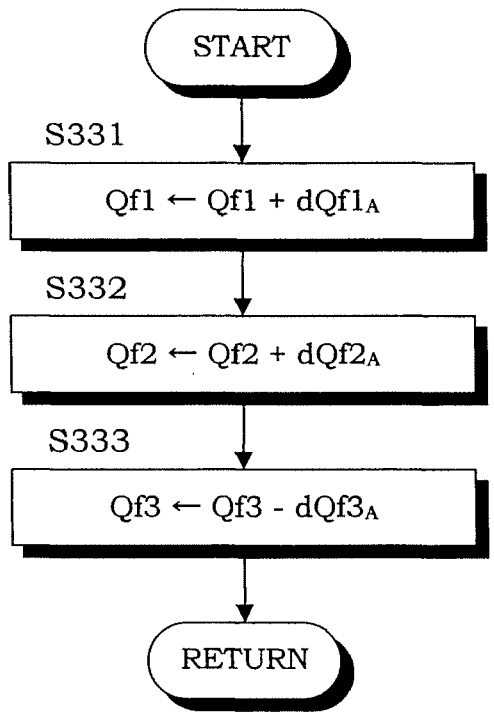
FIGS. 17A and 17B are flowcharts illustrating correction control routines of respective fuel injection amounts during misfire suppression control, which are executed by the controller according to the third embodiment of this invention.

The flame propagation combustion misfire control subroutine will now be described with reference to FIG. 17A.

In a step S331, the controller 41 performs an increase correction by adding a correction value $dQf1_A$ to the n-paraffin injection amount Qf1.

In a step S332, the controller 41 performs an increase correction by adding a correction value $dQf2_A$ to the hydrogen gas injection amount Qf2.

In a step S333, the controller 41 performs a decrease correction by subtracting a correction value $dQf3_A$ from the gasoline injection amount Qf3. The correction value $dQf3_A$ is set at a value which ensures that the total generated heat amount during air-fuel mixture combustion does not vary even after the n-paraffin and hydrogen gas have been increase-corrected.

When a misfire occurs during flame propagation combustion in the former half of air-fuel mixture combustion, the combustion speed of the air-fuel mixture is increased by increase-correcting the hydrogen gas injection amount, and the self-ignitability of the air-fuel mixture is increased by increase-correcting the n-paraffin injection amount. In so doing, the flame propagation combustion can be stabilized, and self-ignition combustion can be performed more reliably.

The controller 41 is constituted to repeat the processing of the steps S331-S333 until misfires during flame propagation combustion are determined to be suppressed in the step S302. The controller 41 may be constituted to set the correction values $dQf1_A$-$dQf3_A$ of the respective fuels in accordance with the value of the cylinder pressure $P_A$.

Figure 17B:
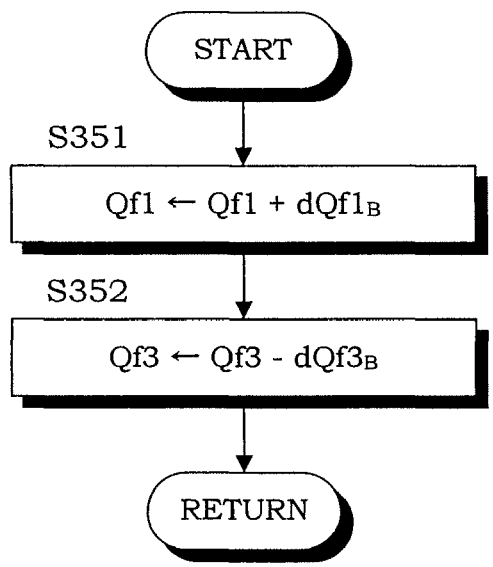

Referring to FIG. 17B, the self-ignition combustion misfire control subroutine will be described.

In a step S351, the controller 41 performs an increase correction by adding a correction value $dQf1_B$ to the n-paraffin injection amount Qf1.

In a step S352, the controller 41 performs a decrease correction by subtracting a correction value $dQf3_B$ from the gasoline injection amount Qf3. The correction value $dQf3_B$ is set at a value which ensures that the total generated heat amount during air-fuel mixture combustion does not vary even after the n-paraffin injection amount has been increase-corrected.

When a misfire occurs during self-ignition combustion, the self-ignitability of the air-fuel mixture is increased by increase-correcting the n-paraffin injection amount, and therefore misfires can be suppressed during self-ignition combustion.

The controller 41 is constituted to repeat the processing of the steps S351 and S352 until misfires during self-ignition combustion subroutine are determined to be suppressed in the step S304. The controller 41 may be constituted to set the correction values $dQf1_B$, $dQf3_B$ in accordance with the value of the cylinder pressure $P_B$.

Figure 18A:
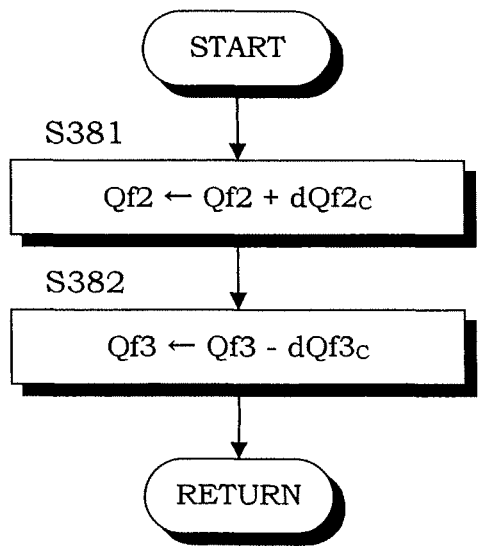
FIGS. 18A and 18B are flowcharts illustrating correction control routines of respective fuel injection amounts during knocking suppression control, which are executed by the controller according to the third embodiment of this invention.

When it is determined in the step S307 that weak knocking is occurring in the internal combustion engine 100, the weak knocking control subroutine is executed as shown in FIG. 18A.

In a step S381, the controller 41 performs an increase correction by adding a correction value $dQf2_C$ to the hydrogen gas injection amount Qf2.

In a step S382, the controller 41 performs a decrease correction by subtracting a correction value $dQf3_C$ from the gasoline injection amount Qf3. The correction value $dQf3_C$ is set at a value which ensures that the total generated heat amount during air-fuel mixture combustion does not vary even after the hydrogen gas injection amount has been increase-corrected.

When weak knocking occurs, the combustion speed of the air-fuel mixture is increased by increase-correcting the hydrogen gas injection amount. In so doing, the combustion period of the air-fuel mixture can be shortened such that weak knocking can be suppressed.

The controller 41 is constituted to repeat the processing of the steps S381 and S382 until the weak knocking is determined to be suppressed in the step S307. The controller 41 may be constituted to set the correction values $dQf2_C$, $dQf3_C$ in accordance with the value of the knocking level N.

Figure 18B:
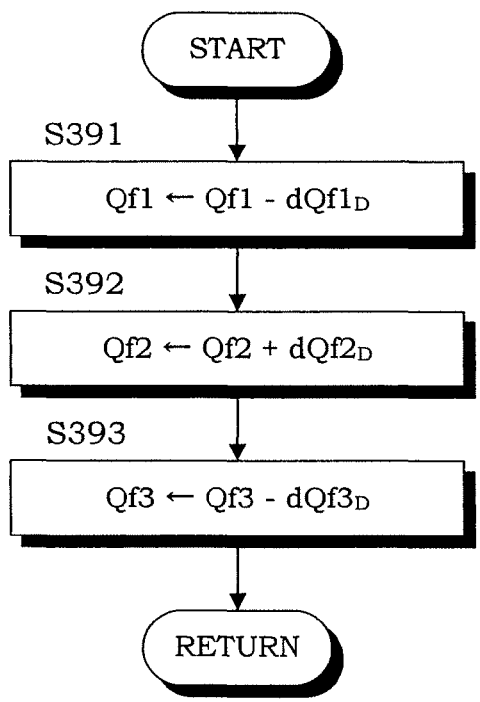

On the other hand, when it is determined that strong knocking is occurring in the internal combustion engine 100, the strong knocking control subroutine is executed as shown in FIG. 18B.

In a step S391, the controller 41 performs a decrease correction by subtracting a correction value $dQf1_D$ from the n-paraffin injection amount Qf1.

In a step S392, the controller 41 performs an increase correction by adding a correction value $dQf2_D$ to the hydrogen gas injection amount Qf2.

In a step S393, the controller 41 performs a decrease correction by subtracting a correction value dQf3D from the gasoline injection amount Qf3. The correction value $dQf3_D$ is set at a value which ensures that the total generated heat amount during air-fuel mixture combustion does not vary even after the n-paraffin injection amount has been decrease-corrected and the hydrogen gas injection amount has been increase-corrected.

When strong knocking occurs, the combustion speed of the air-fuel mixture is increased by increase-correcting the hydrogen gas injection amount, and the self-ignitability of the air-fuel mixture is reduced by decrease-correcting the n-paraffin injection amount. In so doing, self-ignition of the air-fuel mixture can be suppressed while shortening the combustion period of the air-fuel mixture, and as a result, strong knocking can be suppressed.

The controller 41 is constituted to repeat the processing of the steps S391-S393 until the strong knocking is determined to be suppressed in the step S306. The controller 41 may be constituted to set the correction values $dQf1_D$-$dQf3_D$ of the respective fuels in accordance with the value of the knocking level N.

With the internal combustion engine 100 according to the third embodiment, the following effects can be obtained.

In the internal combustion engine 100, the injection amounts of the respective fuels are corrected in accordance with the combustion condition of the air-fuel mixture when the engine operating condition is in the region A, and therefore the combustion condition of the air-fuel mixture can be stabilized.

The contents of JP2007-204709 with a filing data of Aug. 6, 2007 in Japan, and JP2008-107232 with a filing data of Apr. 16, 2008 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

In the first embodiment, for example, the n-paraffin and hydrogen gas are both injected into the intake passage 15 by the fuel injection valve 22, 23, but these fuels may be injected directly into the combustion chamber 14. By injecting the n-paraffin directly into the combustion chamber 14, a situation in which the air-fuel mixture undergoes self-ignition combustion before the resulting premix has advanced sufficiently can be avoided. Further, by injecting the hydrogen gas directly into the combustion chamber 14, backfiring toward the intake passage 15 can be prevented.

In the second embodiment, the auxiliary combustion chamber 142 is formed by installing a specialized member, but an indentation may be provided in the cylinder block 11 or cylinder head 12 such that the auxiliary combustion chamber 142 is formed by the indentation.

In the third embodiment, knocking is determined on the basis of the detection value from the knocking level sensor 55, but knocking may be determined on the basis of the detection value from the cylinder pressure sensor 54. In this case, weak knocking is determined to have occurred when an amplitude M of the cylinder pressure in a cylinder pressure waveform of a frequency band unique to knocking is larger than a reference value $M_1$ and smaller than a reference value $M_2$. Strong knocking is determined to have occurred when the amplitude M is larger than the reference value $M_2$.

In the third embodiment, a misfire is determined by comparing the cylinder pressure detected by the cylinder pressure sensor 54 with a reference pressure, but a misfire may be determined on the basis of a generated heat amount calculated from the detected cylinder pressure during combustion. When a generated heat amount $Q_A$ calculated on the basis of the cylinder pressure P during the flame propagation combustion period is smaller than a reference generated heat amount $Q_1$, it is determined that a misfire has occurred in the flame propagation combustion. When a generated heat amount $Q_B$ calculated on the basis of the cylinder pressure P during the self-ignition combustion period is smaller than a reference generated heat amount $Q_2$, it is determined that a misfire has occurred in the self-ignition combustion.

During a misfire, the rate of change in the angular velocity of the crankshaft is smaller than that of a normal period, and therefore a misfire may be determined on the basis of the rate of change in the angular velocity. The rate of change in the angular velocity may be calculated on the basis of the detection value of the crank angle sensor 52. When an angular velocity rate of change $\Delta w_A$ during the flame propagation combustion period is smaller than a reference rate of change $\Delta w_1$, it is determined that a misfire has occurred in the flame propagation combustion. When an angular velocity rate of change $\Delta w_B$ during the self-ignition combustion period is smaller than a reference rate of change $\Delta w_2$, it is determined that a misfire has occurred in the self-ignition combustion.

An ion current sensor may be provided in the spark plug 25, and a misfire may be determined on the basis of the ion current during combustion of the air-fuel mixture. When the air-fuel mixture burns, cations are generated in accordance with the combustion condition. The ion current sensor detects an ion current generated by the cations. When an ion current $I_A$ during the flame propagation combustion period is smaller than a reference current value $I_1$, it is determined that a misfire has occurred in the flame propagation combustion. When an ion current $I_B$ during the self-ignition combustion period is smaller than a reference current value $I_2$, it is determined that a misfire has occurred in the self-ignition combustion.

Figure 19:
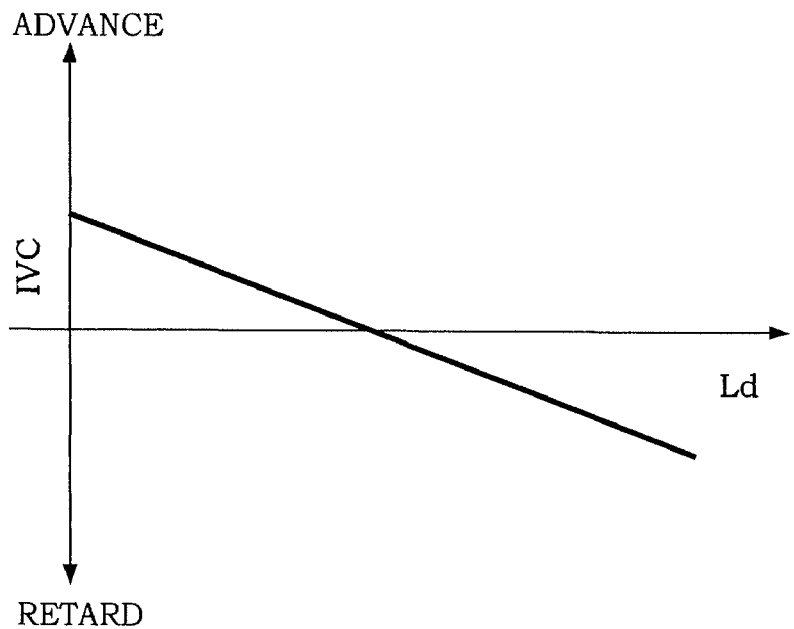
FIG. 19 is a diagram illustrating optional control of a closing timing of an intake valve of the internal combustion engine, which is executed by the controller according to the first-third embodiments of this invention.

In the first-third embodiments, the intake valve 16 may be driven by a variable valve driving mechanism. Referring to FIG. 19, in case that a closing timing IVC of the intake valve 16 is set after piston bottom dead center, the closing timing IVC of the intake valve 16 is advanced toward the piston bottom dead center side as the engine load Ld decreases. By controlling the closing timing IVC, An effective compression ratio of the internal combustion engine 100 increases. Hence, the self-ignitability of the n-paraffin can be increased, and self-ignition combustion can be performed with stability.

Figure 20:
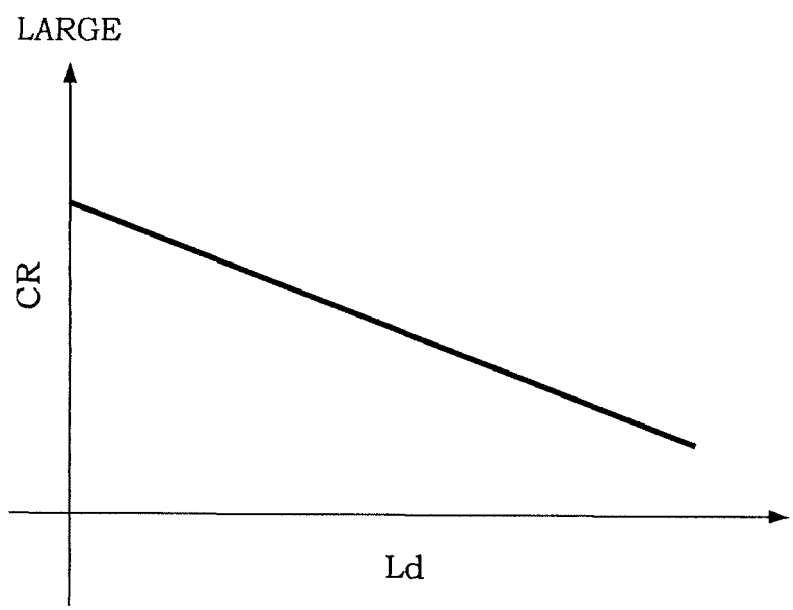
FIG. 20 is a diagram illustrating optional control of a compression ratio of the internal combustion engine, which is executed by the controller according to the first-third embodiments of this invention.

In the first-third embodiments, as shown in FIG. 1, FIG. 9 and FIG. 15, a variable compression ratio mechanism 71 that variably controls a mechanical compression ratio of the internal combustion engine 100 may be provided. In this case, as shown in FIG. 20, the self-ignitability action of the n-paraffin can be enhanced by increasing a mechanical compression ratio CR in relation to a reduction in the engine load Ld. As a result, self-ignition combustion can be performed with stability. In addition to stable self-ignition, an improvement in thermal efficiency can be obtained when the mechanical compression ratio CR is increased.

In the first-third embodiments, a predetermined combustion speed and predetermined self-ignitability are achieved by supplying a plurality of fuels having difference properties individually. However, to obtain the predetermined self-ignitability and combustion speed, a plurality of premixed fuels having different compositions may be stored in individually provided fuel tanks, and these fuels may be supplied alternately to the internal combustion engine 100 in accordance with the operating condition.

In the first-third embodiments, a fuel tank that stores the n-paraffin and a fuel tank that stores the hydrogen gas may be provided in addition to the fuel tank 31 that stores the gasoline such that the fuels stored in the respective fuel tanks are supplied to the respective fuel injection valves 21-23.

In addition to n-paraffin, light oil, dimethyl ether, diethyl ether, or any other fuel classified as having a high cetane value may be employed as the first fuel.

In addition to hydrogen, ethylene, acetylene, or any other fuel having a high stratified combustion speed may be employed as the second fuel.

The embodiments of this invention in which an exclusive property or privilege are claimed are defined as follows:

What is claimed is:

1. An internal combustion engine comprises:
    a fuel injection valve which supplies a first fuel having a higher self-ignitability than gasoline and a second fuel having a higher combustion speed than gasoline such that an air-fuel mixture containing the first fuel and the second fuel is formed in a combustion chamber;
    a spark plug which ignites the air-fuel mixture; and
    a programmable controller programmed to control supply proportions of the first fuel and the second fuel such that the ignited air-fuel mixture undergoes flame propagation combustion and then undergoes self-ignition combustion.

2. The internal combustion engine as defined in claim 1, wherein the fuel injection valve forms a homogeneous air-fuel mixture containing the first fuel and the second fuel throughout the entire combustion chamber.

3. The internal combustion engine as defined in claim 2, wherein the fuel injection valve supplies a third fuel having a lower self-ignitability than the first fuel and a lower combustion speed than the second fuel, in addition to the first fuel and the second fuel, such that a homogeneous air-fuel mixture containing the first fuel, the second fuel, and the third fuel is formed throughout the entire combustion chamber.

4. The internal combustion engine as defined in claim 3, wherein the programmable controller increases the supply proportions of the first fuel and the second fuel and reduces a supply proportion of the third fuel as an engine load decreases.

5. The internal combustion engine as defined in claim 3, wherein the programmable controller determines whether or not the internal combustion engine is in a cold condition, and increases the supply proportions of the first fuel and the second fuel and reduces the supply proportion of the third fuel when the internal combustion engine is in a cold condition in comparison with a warm condition.

6. The internal combustion engine as defined in claim 3, wherein the programmable controller determines whether or not a misfire has occurred in the flame propagation combustion, and increases the supply proportions of the first fuel and the second fuel and reduces the supply proportion of the third fuel when a misfire has occurred in the flame propagation combustion.

7. The internal combustion engine as defined in claim 3, wherein the programmable controller determines whether or not a misfire has occurred in the self-ignition combustion, and increases the supply proportion of the first fuel and reduces the supply proportion of the third fuel when a misfire has occurred in the self-ignition combustion.

8. The internal combustion engine as defined in claim 3, wherein the programmable controller determines whether or not knocking has occurred, and increases the supply proportion of the second fuel and reduces the supply proportion of the third fuel when knocking has occurred.

9. The internal combustion engine as defined in claim 8, wherein the programmable controller determines whether or not knocking stronger than a reference value has occurred, and increases the supply proportion of the second fuel and reduces the supply proportions of the first fuel and the third fuel when knocking stronger than the reference value has occurred.

10. The internal combustion engine as defined in claim 1, wherein
   the combustion chamber includes a main combustion chamber having a volume which varies in accordance with a movement of a piston, and a auxiliary combustion chamber which has a fixed volume and communicates with the main combustion chamber through an injection hole,
   the fuel injection valve forms a homogeneous air-fuel mixture containing the first fuel in the main combustion chamber and forms a homogeneous air-fuel mixture containing the second fuel in the auxiliary combustion chamber,
   the spark plug ignites the homogeneous air-fuel mixture containing the second fuel formed in the auxiliary combustion chamber, and
   the programmable controller adjusts the supply proportions of the first fuel and the second fuel such that the air-fuel mixture in the main combustion chamber undergoes flame propagation combustion on the basis of a flame torch generated through combustion of the air-fuel mixture in the auxiliary combustion chamber following ignition thereof by the spark plug, and then undergoes self-ignition combustion.

11. The internal combustion engine as defined in claim 10, wherein the fuel injection valve supplies a third fuel having a lower self-ignitability than the first fuel and a lower combustion speed than the second fuel to the main combustion chamber such that a homogeneous air-fuel mixture containing the first fuel and the third fuel is formed in the main combustion chamber.

12. The internal combustion engine as defined in claim 11, wherein the programmable controller increases the supply proportion of the first fuel and reduces a supply proportion of the third fuel as an engine load decreases.

13. The internal combustion engine as defined in claim 11, wherein the programmable controller increases a supply amount of the second fuel as the engine load decreases.

14. The internal combustion engine as defined in claim 11, wherein the programmable controller determines whether or not the internal combustion engine is in a cold condition, and increases the supply proportion of the first fuel and reduces the supply proportion of the third fuel when the internal combustion engine is in a cold condition in comparison with a warm condition.

15. The internal combustion engine as defined in claim 14, wherein the programmable controller increases the supply amount of the second fuel when the internal combustion engine is in a cold condition in comparison with a warm condition.

16. The internal combustion engine as defined in claim 1, wherein the programmable controller increases an excess air factor of the air-fuel mixture as the engine load decreases.

17. The internal combustion engine as defined in claim 1, wherein the programmable controller adjusts the fuel supply proportions when an engine operating condition is in a predetermined low engine load, low engine rotation speed region.

18. The internal combustion engine as defined in claim 1, wherein further comprising a variable valve driving mechanism which brings a closing timing of an intake valve closer to a piston bottom dead center timing so as to increase an effective compression ratio as the engine load decreases.

19. The internal combustion engine as defined in claim 1, wherein further comprising a variable compression ratio mechanism which increases a mechanical compression ratio as the engine load decreases.

20. An internal combustion engine comprises:
   means for supplying a first fuel having a higher self-ignitability than gasoline and a second fuel having a higher combustion speed than gasoline such that an air-fuel mixture containing the first fuel and the second fuel is formed in a combustion chamber;
   means for igniting the air-fuel mixture so as to perform flame propagation combustion; and
   means for controlling supply proportions of the first fuel and the second fuel such that the ignited air-fuel mixture undergoes flame propagation combustion and then undergoes self-ignition combustion.

* * * * *